Figure 1:
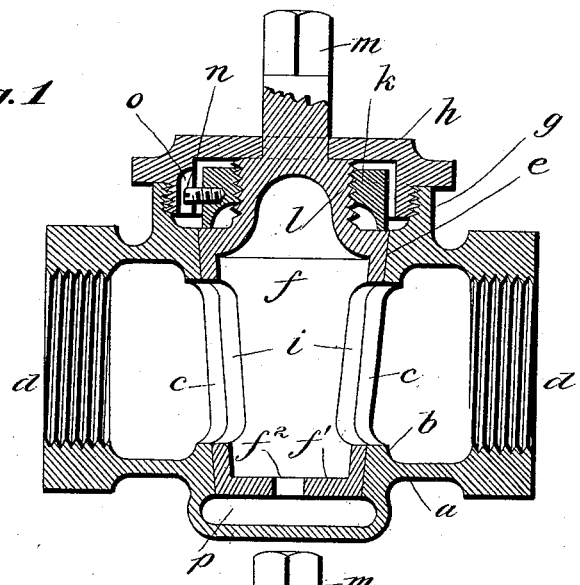

(No Model.)

H. E. KEYES.
STRAIGHTWAY VALVE.

No. 543,693. Patented July 30, 1895.

Witnesses:
J. T. Coleman
E. A. Pinnel

Inventor
Harry E. Keyes,
by Wm. N. Finckel
Atty.

UNITED STATES PATENT OFFICE.

HARRY E. KEYES, OF HOMESTEAD, PENNSYLVANIA, ASSIGNOR TO THE HOMESTEAD MANUFACTURING COMPANY, LIMITED, OF SAME PLACE.

STRAIGHTWAY VALVE.

SPECIFICATION forming part of Letters Patent No. 543,693, dated July 30, 1895.

Application filed November 27, 1894. Serial No. 530,138. (No model.)

*To all whom it may concern:*

Be it known that I, HARRY E. KEYES, a citizen of the United States, residing at Homestead, in the county of Allegheny and State of Pennsylvania, have invented a certain new and useful Improvement in Straightway Valves, of which the following is a full, clear, and exact description.

This invention relates to valves or turning plugs for use in steam, water, gas, and other service plants.

The first object of the invention is to insure the seating of the valve in closing and ease it off its seat in opening; and the second object of the invention is to provide against damage of adjacent property by leakage.

While I do not limit my invention to its use on straightway turning-plugs or valves, still for purposes of illustration I have shown in the drawings accompanying this description only this one application of my invention, and will confine this description to such form.

Figure 2:
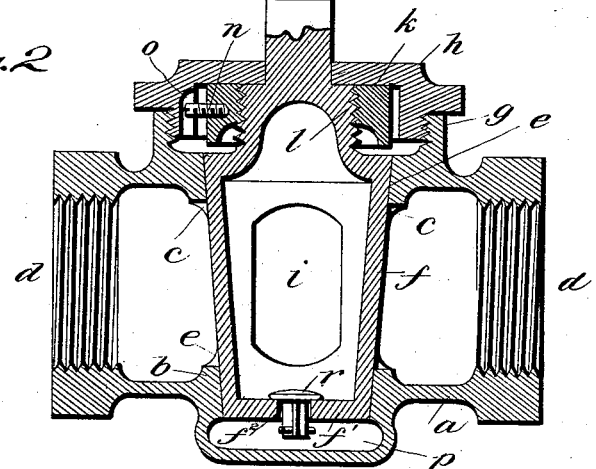
Figure 3:
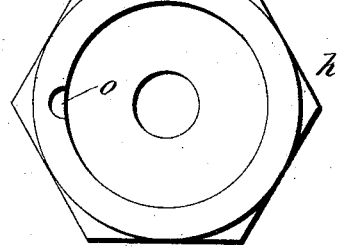
Figure 4:
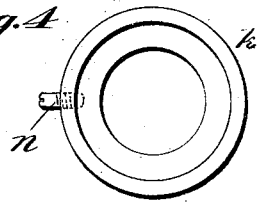

In the accompanying drawings, in the several figures of which like parts are similarly designated, Figure 1 is a longitudinal vertical section showing the valve open. Fig. 2 is a similar view showing the valve closed, and also illustrating the application of a check-valve in the leakage-port. Fig. 3 is a bottom plan view of the cap, and Fig. 4 is a bottom plan view of the traveling nut.

The valve casing or shell *a* is made with the tapering plug-seat *b*, having the straightway ports *c c* in alignment with the inlet and outlet nipples *d d*. The shell is provided also with the top opening *e* for the insertion and removal of the tapering plug *f*, and said opening is provided with the screw-threaded flange *g* to receive the cap or bonnet *h*.

The plug *f* is made hollow, and with the straightway ports *i i* to register with the ports *c c* in the seat and the solid walls between said seat-ports to open and close the valve respectively, as indicated respectively in Figs. 1 and 2. It is not an unusual thing for the walls of hollow plugs to be warped or distorted under pressure as the said plug is in use, and the cause of this defect I believe to be in the imperfect seating of the valve or plug. For this, among other reasons, I provide means for surely seating the plug, and such means consists of a traveling nut *k* applied to a screw-threaded portion *l* of the stem *m* of the plug and held from turning therewith as the plug is rotated to open and close the valve by the engagement of a pin *n*, fast in the nut, with the groove *o* in the bonnet or cap. It will be seen, therefore, that as the plug is rotated to open the valve the nut will be caused to descend upon the top of the plug proper and allow the plug to be rotated freely, at the same time acting as a sort of jam or check nut to prevent it from turning unduly; and that as the plug is rotated to close the valve the said nut will travel upwardly and abut against the cap or bonnet or interposed packing to stay the further rotation of the plug and drive it home tightly to its seat, thus insuring tight seating and obviating not alone the liability to warping but also loose seating and consequent leakage. The nut is circular instead of polygonal, as in my application, Serial No. 524,536, filed September 29, 1894, and this form is adapted for reasons of economy in the manufacture of the valve.

The parts are assembled by applying the nut to the plug and the cap to the nut and then turning the whole on and into the shell, templets or gages being necessarily used to determine the relative positions of the parts in assembling them and the shell in order to insure the final seating of the plug in open or closed position, preferably the open position.

The adjustment of the nut upon the stem to compensate for wear may be effected by turning the nut upon the stem and inserting the pin *n* in a new hole in the nut.

In some high pressures and with some fluids leakage will take place in the very best of valves, and in order to avoid damage to surrounding objects as well as to prevent loss of fluid from such leakage I modify the construction of the plug and of the shell or casing. The plug has its bottom $f'$ closed saving for a hole $f^2$, and the shell opposite the opening $e$ is made solid to form a leakage chamber or pocket $p$, wherein the lower end of the plug is completely inclosed. Ordinarily in this class of valves the plug extends through the shell and is arranged in opposite openings therein, and is held in the shell and to its seat by a nut and washer applied to its lower end, the said nut and washer serving to close ordinarily in a very ineffective manner the lower opening in the shell. Despite the best of fitting there will be leakage around the plug, which will find its way out at such lower opening. In the use of the old form of valve for liquids such leakage is apt to damage surrounding objects, and in the case of volatile liquids or gases the atmosphere is polluted and danger of explosion is incurred. In the case of my closed shell with its leakage-pocket the leakage cannot escape from the shell, and whatever leakage there is passes into the pocket and thence overflows through the hole $f^2$ into the hollow plug, and thence into the service-pipe after the next opening of the valve.

When the valve is used in the service of liquids or fluids containing grit—as, for instance, in hydraulic mains where sand and small gravel are carried by the water—there is liability of the pocket being filled up by such sediment, thus rendering it ineffective; and in order to overcome this objection I provide the hole $f^2$ with a check-valve $r$, Fig. 2, arranged in said hole to close outwardly and free to open inwardly. With this provision the hole will be closed against the passage of sediment into the pocket, and at the same time any pressure or fluid leaking in the leakage-pocket will be sufficient to open the check-valve for its escape when the plug itself has been opened, the sediment being washed away by the passage of the fluid when the valve is opened.

What I claim is—

1. A valve provided with a tapering seat having lateral ports, a hollow plug adapted to said seat and also having complemental lateral ports, a stem on said plug provided with a screwthreaded portion, a traveling nut applied to said screwthreaded portion and itself having a laterally projecting pin, and a bonnet applied to the valve shell and inclosing the said traveling nut and provided with a groove to receive the pin of the nut, substantially as and for the purpose described.

2. A valve comprising a shell having usual inlet and outlet openings, a top opening for the insertion of the valve proper or plug, a valve seat extending transversely of the shell, and an inclosed leakage pocket at one end of said valve seat opposite the top opening, combined with a valve adapted to said seat and connected with said leakage pocket by an opening, and a check valve in said opening, substantially as described.

3. A valve shell having an opening for the insertion of the plug or valve proper, a valve seat, and an inclosed leakage pocket at one end of said seat, combined with a valve proper or plug adapted to said seat and provided with a bottom opening leading into said plug and a check valve arranged in said opening and opening away from the leakage pocket into said plug, substantially as and for the purpose described.

In testimony whereof I have hereunto set my hand this 21st day of November, A. D. 1894.

HARRY E. KEYES.

Witnesses:
FREDERICK SCHUEHMAN,
REID KENNEDY.